June 12, 1956  C. E. HITTLE  2,750,128
MECHANICAL FILTER
Filed Nov. 29, 1952

INVENTOR.
Carl E. Hittle
BY
ATTORNEY.

United States Patent Office 2,750,128
Patented June 12, 1956

2,750,128

MECHANICAL FILTER

Carl E. Hittle, North Hollywood, Calif., assignor to Radio Corporation of America, a corporation of Delaware Application November 29, 1952, Serial No. 323,225

3 Claims. (Cl. 242—75)

This invention relates to a film drive system, and particularly to a simple and economical mechanical filter unit for a film roller and the damping element for the filter.

It is well-known that the advancement of sound film in sound recorders and reproducers should be at a constant and uniform rate, particularly at the sound translation point. Since the film is unwound from supply reels and wound on take-up reels, the diameters of the rolls of film on the respective reels vary as the film is advanced through the apparatus. This introduces variations in tension in the film which have a tendency to vary the uniformity of the film advancement at the sound translation points whether photographic or magnetic. The present invention is directed to mechanical filter units for rollers positioned between the film advancing sprocket and the supply and take-up reels, and particularly the damping element for the filter. The units are not only economical to manufacture, but are particularly easy to install and are efficient in operation.

The principal object of the invention, therefore, is to facilitate the uniform advancement of film.

Another object of the invention is to provide an improved mechanical filter unit for the advancement of film.

A further object of the invention is to provide a simple and economical damping element of a filter unit for a filter roller in a film advancing system.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
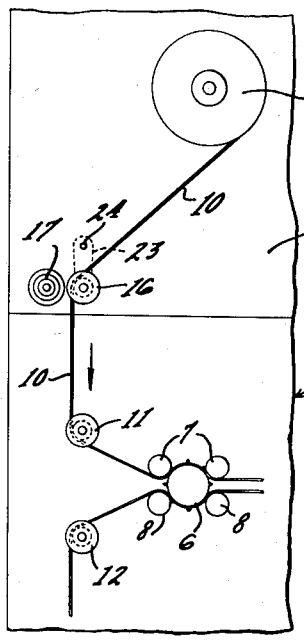
Fig. 1 is a partial front elevational view of a system in which the invention is used.
Figure 2:
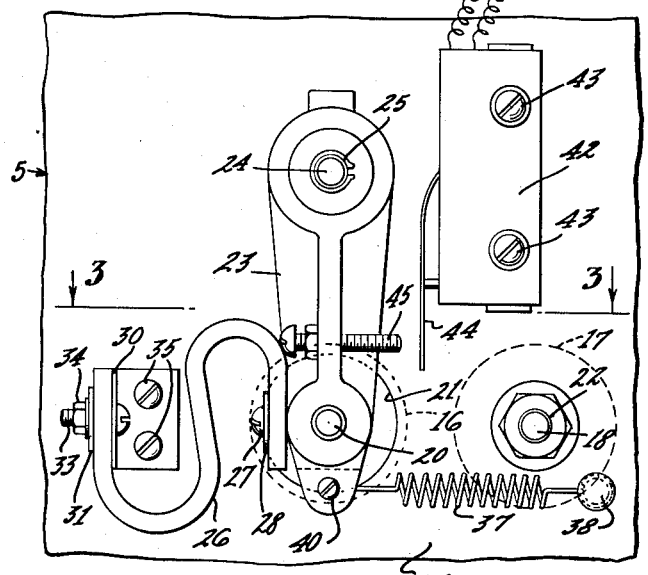
Fig. 2 is a rear elevational view of a filter unit embodying the invention.
Figure 3:
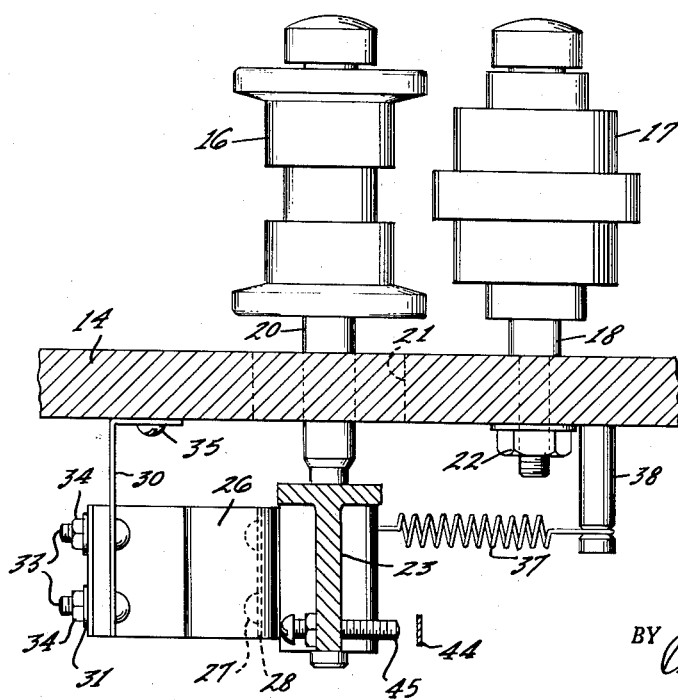
Fig. 3 is a plan view of the unit of Figs. 1 and 2 taken along the line 3—3 of Fig. 2.

Referring now to the drawings, in which the same numerals identify like elements, a portion of a panel 5 has mounted thereon a film drive sprocket 6 with its associate pad rollers 7 and 8, which advances the film 10 around fixedly positioned guide rollers 11 and 12. A portion of a panel shown at 14 supports a supply reel 15, the film 10 passing from the reel 15 around the filter roller 16 past a fixed roller 17 mounted on a shaft 18 attached to panel 14 by a nut 22. The film, to and from the sprocket 6, is advanced to photographic or magnetic sound recording or reproducing element or units, not shown. From the roller 12, the film 10 passes between another pair of rollers similar to rollers 16 and 17, and then to a take-up reel, not shown.

The roller 16 is mounted on a shaft 20 passing through an opening 21 in the panel 14. The shaft 20 is mounted on the lower end of an arm 23, pivoted on a shaft 24, and held thereon by a retainer ring 25. To the lower portion of the arm 23, there is attached one end of a strip 26 of relatively non-elastic, but flexible material, such as "Viscoloid," which is Du Pont special Pyralin No. 48,562, disclosed and claimed in U. S. Patent No. 1,430,020. This end of the strip is attached by a screw 27 and plate 28 to arm 23, the strip then being formed into an S configuration and the other end of the strip fixedly anchored between a plate 30 and a plate 31 fastened by bolts 33 and nuts 34. The plate 30 is attached to the panel 14 by screws 35. A tensioning spring 37 anchored on a pin 38 attached to the panel 14 has its other end attached to a screw 40 on the end of the arm 23. Thus, the filter unit is formed by the tension of the spring 37 and the resiliency of the strip 26.

A microswitch is shown at 42 mounted in position by screws 43, and having a lever 44 which is actuated by a screw 45 mounted on the arm 23. This microswitch is adapted to control a film reel motor according to the position of the roller 16.

When the film is initially tensioned, roller 16 is moved to its extreme position away from roller 17. Without the damping strips 26, roller 16 would oscillate within the confines of the clearance hole 21 due to the interaction between the varying film tension and resiliency of spring 37. This would result in unsteady film speed at the sound translation point. This unsteady film speed would produce what is known as "wows" or "flutter," and is undesirable. By the use of the damping strip 26 mounted as above described, the oscillations of roller 16 are dampened sufficiently rapidly so as not to contribute to any unsteady film speed at the translation point. The position of said damping element on the opposite side of said arm and substantially in a direct line with the axis of spring 37, together with its S configuration, provides a particularly efficient damping action with a minimum sized element. As mentioned above, the same filter unit is used between the take-up reel, not shown, and the sprocket 6.

I claim:

1. A mechanical filter unit for an oscillatory film roller comprising a shaft, an arm having one end pivoted on said shaft, a second shaft on the other end of said arm, a roller rotatable on said second shaft, a spring tensioning said arm in one direction, and a free, flexible, relatively non-elastic strip in an S configuration having one end attached to said arm adjacent said roller and the other end anchored in a fixed position, said strip being a mechanical damper with its damping action substantially in a direct line with the axis of said spring and the movement of the end of said arm to which said spring is attached, said strip being on the opposite side of said arm from said spring.

2. A mechanical filter unit for a film advancing system in which a sprocket advances film from a supply reel and feeds film to a take-up reel, film rollers being positioned between said supply and take-up reels and said sprocket, comprising an arm on one end of which one of said rollers is rotatable, means for pivoting said arm to permit oscillatory movement of said roller with variations in film tension, a spring for urging said arm in one direction, said spring having its axis substantially in line with the movement of the end of said arm, and a free, flexible, relatively non-elastic strip having one end attached to said arm adjacent said roller, and the other end of said strip attached to a fixed anchor, said strip being a damper having an S configuration and a damping action substantially in a direct line with the axis of said spring, said strip being located on the opposite side of said arm from said spring.

3. A damping unit for a mechanical filter for a film advancing mechanism having a roller tensioned by a spring in a film loop comprising a free, flat, flexible, and relatively non-elastic strip, and supporting means for said roller, one end of said strip being attached to said supporting means and the other end of said strip being fixedly anchored, said strip having an S configuration with its damping action substantially in a direct line with the movement of said roller and positioned on the opposite side of said supporting means from said spring.

References Cited in the file of this patent

UNITED STATES PATENTS

| | | |
|---|---|---|
| 325,033 | Wetmore | Aug. 25, 1885 |
| 1,892,554 | Kellogg | Dec. 27, 1932 |
| 1,994,885 | De Florez | Mar. 19, 1935 |
| 2,006,628 | Cline | July 2, 1935 |
| 2,188,469 | Allen | Jan. 30, 1940 |
| 2,294,674 | Lord | Sept. 1, 1942 |
| 2,296,753 | Wilton | Sept. 22, 1942 |
| 2,499,210 | Bartelson | Feb. 28, 1950 |

FOREIGN PATENTS

| | | |
|---|---|---|
| 506,654 | Great Britain | June 1, 1939 |